US012667862B2

(12) United States Patent
Yang et al.

(10) Patent No.: US 12,667,862 B2
(45) Date of Patent: Jun. 30, 2026

(54) ANILOX ROLLER AND COATING APPARATUS

(71) Applicant: CONTEMPORARY AMPEREX TECHNOLOGY (HONG KONG) LIMITED, Hong Kong (CN)

(72) Inventors: Pengjun Yang, Ningde (CN); Zhenguang Tang, Ningde (CN); Zhuhua Lin, Ningde (CN); Hongwu Shang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 623 days.

(21) Appl. No.: 18/192,737

(22) Filed: Mar. 30, 2023

(65) Prior Publication Data

US 2024/0091805 A1 Mar. 21, 2024

(30) Foreign Application Priority Data

Sep. 15, 2022 (CN) ......................... 202222447529.0

(51) Int. Cl.
*B05C 1/08* (2006.01)

(52) U.S. Cl.
CPC .......... *B05C 1/0808* (2013.01); *B05C 1/0826* (2013.01)

(58) Field of Classification Search
USPC ................... 118/244, 245, 256, 200; 101/24, 101/150–157, 216
See application file for complete search history.

(56) References Cited

U.S. PATENT DOCUMENTS

2011/0214580 A1* 9/2011 Sauter ........................ B31F 1/07 101/24

FOREIGN PATENT DOCUMENTS

| | | | | |
|---|---|---|---|---|
| CN | 106827806 A | * 6/2017 | | C23C 4/06 |
| CN | 209479209 U | * 10/2019 | | |
| CN | 113130839 B | 5/2022 | | |
| CN | 216965184 U | 7/2022 | | |
| WO | WO-2022003381 A1 | * 1/2022 | | B31F 1/07 |

OTHER PUBLICATIONS

English Translation CN-106827806A (Year: 2017).*
English Translation CN-209479209 U (Year: 2019).*
English Translation CN-216965184 U (Year: 2022).*
Extended European Search Report dated Mar. 13, 2024 for Application No. EP 23165287.6.
Intention to grant dated Sep. 11, 2025 for application EP 23 165 287.6.

* cited by examiner

*Primary Examiner* — Yewebdar T Tadesse
(74) *Attorney, Agent, or Firm* — Ladas & Parry LLP

(57) ABSTRACT

An anilox roller and a coating apparatus are provided. The anilox roller includes a roller body and an annular boss formed on a surface of the roller body. The annular boss extends in a circumferential direction of the roller body. The annular boss includes a circumferential surface, a first side surface, and a second side surface. The first side surface and the second side surface face each other in an axial direction of the roller body. The circumferential surface connects the first side surface and the second side surface, and the circumferential surface includes an anilox region having an etched anilox. A first blank region without an etched anilox is arranged between the anilox region and the first side surface.

10 Claims, 6 Drawing Sheets

ANILOX ROLLER AND COATING APPARATUS

CROSS REFERENCE TO RELATED APPLICATION

This application claims priority to Chinese Patent Application No. 202222447529.0, filed on Sep. 15, 2022, which is incorporated herein by reference in its entirety.

TECHNICAL FIELD

The present application relates to the technical field of battery coating devices, and in particular, to an anilox roller and a coating apparatus.

BACKGROUND

Coating is an essential process in the production of battery cells, and also a key process that directly affects the safety, capacity, life, and other performances of batteries.

An anilox roller is an important component of a coating apparatus. An anilox on the anilox roller can bond a slurry and then evenly coat the slurry to a surface of a substrate.

During the coating process, in order to avoid interference of an anilox roller, a stepped anilox roller may be selected for coating processing, but when the stepped anilox roller is used for coating a slurry, there is a problem of poor coating consistency.

SUMMARY

In view of the above problems, the present application provides an anilox roller and a coating apparatus, which is capable of improving the coating consistency of the anilox roller when coating a slurry.

In a first aspect, the present application provides an anilox roller, and the anilox roller includes a roller body and an annular boss formed on a surface of the roller body. The annular boss extends in a circumferential direction of the roller body. The annular boss includes a circumferential surface, a first side surface, and a second side surface. The first side surface and the second side surface face each other in an axial direction of the roller body. The circumferential surface connects the first side surface and the second side surface, and the circumferential surface includes an anilox region having an etched anilox. A first blank region without an etched anilox is arranged between the anilox region and the first side surface.

In the technical solution of the embodiments of the present application, by arranging the first blank region without an etched anilox between the anilox region and the first side surface, a slurry will not be bonded near a joint of the first side surface of the annular boss and the circumferential surface, which can reduce the possibility of a change of a substrate coating width caused by a wrap angle fluctuation of an edge of the annular boss on the substrate, and can improve the coating consistency of the anilox roller when coating the slurry.

In some embodiments, a first arc chamfer is formed between the circumferential surface and the first side surface, a radius of the first arc chamfer is $R_1$, and a width of the first blank region is $W_1$, meeting $W_1 \geq R_1$. The arrangement of the first arc chamfer can reduce the possibility of scratching the substrate by the annular boss. $W_1 \geq R_1$ can reduce the difficulty of etching the anilox.

In some embodiments, 0.1 mm$\leq R_1 \leq$2 mm, and 0.1 mm$\leq W_1 \leq$2 mm. Setting $R_1$ within a reasonable range, on the one hand, is capable of reducing the risk of scratching the substrate by the annular boss due to too small $R_1$, and on the other hand, is capable of alleviating the problem of increased production costs due to too large $R_1$. Controlling $W_1$ within a reasonable range, on the one hand, is capable of reducing the possibility of a change in a transverse width of the coating due to too small $W_1$, and on the other hand, is capable of alleviating the problem of increased production costs due to too large $W_1$.

In some embodiments, on the basis of arranging the first blank region, a second blank region without an etched anilox is arranged between the anilox region and the second side surface. With such a design, the slurry will not be bonded near a joint of the first side surface and the circumferential surface of the annular boss and near a joint of the second side surface and the circumferential surface of the annular boss, which can further reduce the possibility of the change of the transverse width of the coating and improve the coating consistency when the anilox roller is coating the slurry.

In some embodiments, a second arc chamfer is formed between the circumferential surface and the second side surface, a radius of the second arc chamfer is $R_2$, and a width of the second blank region is $W_2$, meeting $W_2 \geq R_2$. The arrangement of the second arc chamfer can reduce the possibility of scratching the substrate by the annular boss. $W_2 \geq R_2$ can reduce the difficulty of etching the anilox.

In some embodiments, 0.1 mm$\leq R_2 \leq$2 mm, and 0.1 mm$\leq W_2 \leq$2 mm. Setting $R_2$ within a reasonable range, on the one hand, is capable of reducing the risk of scratching the substrate by the annular boss due to too small $R_2$, and on the other hand, is capable of alleviating the problem of increased production costs due to too large $R_2$. Controlling $W_2$ within a reasonable range, on the one hand, is capable of reducing the possibility of a change in a transverse width of the coating due to too small $W_2$, and on the other hand, is capable of alleviating the problem of increased production costs due to too large $W_2$.

In some embodiments, a height H of the annular boss protruding from the surface of the roller body is H, meeting 1 mm$\leq H \leq$60 mm. Setting H within a reasonable range, on the one hand, is capable of reducing the possibility of interference of the roller body due to too small H. On the other hand, it is capable of alleviating the problem of increased production cost due to too large H.

In some embodiments, 15 mm$\leq H \leq$25 mm.

In some embodiments, the anilox in the anilox region is hexagonal, rhombic, or polyline-shaped. The anilox in the anilox region being hexagonal and rhombic improves the coating efficiency and coating quality, and the anilox in the anilox region being polyline-shaped can reduce the difficulty of etching the anilox.

In some embodiments, a plurality of annular bosses are arranged, and the plurality of the annular bosses are arranged at intervals in the axial direction of the roller body. Such a design improves the coating efficiency.

In a second aspect, the present application provides a coating apparatus, which includes a workpiece tray provided with an accommodating space and the anilox roller in the above embodiment, and the roller body is mounted in the accommodating space in a rolling way.

BRIEF DESCRIPTION OF DRAWINGS

By reading the detailed description of the preferred implementations below, various other advantages and benefits will become apparent to those of ordinary skill in the art. The drawings are for the purpose of illustrating the preferred embodiments only and are not to be considered a limitation to the present application. Moreover, in all of the drawings, the same parts are indicated by the same reference numerals. In the drawings.

Figure 1:
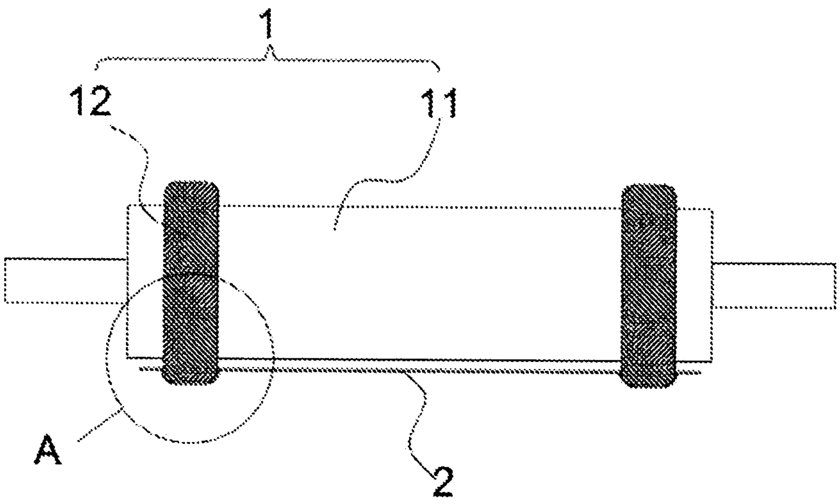
FIG. 1 is a schematic diagram of a microgravure roller coating and processing a substrate according to some embodiments of the present application.

Reference numerals in Detailed Description are as follows:

1—Microgravure roller;
11—Roller shaft;
12—Protruding portion;
2—Substrate;
21—Substrate coating region;
3—Anilox roller;
31—Roller body;
32—Annular boss;
321—Circumferential surface;
322—First side surface;
323—Second side surface;
324—Anilox region;
325—First blank region;
326—First arc chamfer;
327—Second blank region; and
328—Second arc chamfer.

DETAILED DESCRIPTION

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center," "longitudinal," "transverse," "length," "width," "thickness," "upper," "lower," "front," "back," "left," "right," "vertical," "horizontal," "top," "bottom," "inner," "outer," "clockwise," "counterclockwise," "axial," "radial," "circumferential," etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding.

Coating is applying a thin layer of coating material in liquid or powder form on a surface of an object such as fabric, paper, metal foil, or board. Coating is an indispensable step in a production process of battery cells.

The battery cell includes an electrode assembly and an electrolyte solution. The electrode assembly is composed of a positive electrode sheet, a negative electrode sheet, and a separator. The battery cell operates mainly relying on movement of metal ions between the positive electrode sheet and the negative electrode sheet. The positive electrode sheet includes a positive electrode current collector and a positive electrode active material layer. The positive electrode active material layer is coated on partial of a surface of the positive electrode current collector. The positive electrode current collector not coated with the positive electrode active material layer serves as a positive tab. Taking a lithium-ion battery as an example, the material of the positive current collector may be aluminum, and the positive active material may be lithium cobalt oxide, lithium iron phosphate, ternary lithium, lithium manganate, or the like. The negative electrode sheet includes a negative electrode current collector and a negative electrode active material layer. The negative electrode active material layer is coated on partial of a surface of the negative electrode current collector. The negative electrode current collector not coated with the negative electrode active material layer serves as a negative tab. The material of the negative electrode current collector may be copper, and the negative electrode active material may be carbon, silicon, or the like. In order to ensure that no fusing occurs when a large current passes, a plurality of positive tabs stacked together are provided, and a plurality of negative tabs stacked together are provided.

In the production process of battery cells, a coating process is used for coating the positive electrode active material on the positive electrode current collector and coating the negative electrode active material on the negative electrode current collector, that is, a prepared pasty thick slurry (the positive electrode active material or the negative electrode active material) is uniformly, continuously, or intermittently coated on the substrate (the positive electrode current collector or the negative electrode current collector). During coating, it is necessary to ensure the consistency of thicknesses of various coating positions, and control the coating thickness within a tolerance range required by the process.

The coating apparatus used in the coating process includes a workpiece tray and an anilox roller provided with an accommodating space, the slurry may be stored in the accommodating space, and the anilox roller is mounted in the accommodating space in a rolling way. A circumferential surface of the anilox roller is sprayed with a ceramic material and etched by laser to form an anilox, and the anilox is used for bonding the slurry.

In the coating process, in order to reduce the possibility of the anilox roller interfering with other regions and causing concave and convex points on the substrate, a stepped anilox roller, such as a microgravure roller, is generally selected. A microgravure roller generally includes a roller shaft and a protruding portion arranged in the circumferential direction of the roller shaft and protruding from a curved surface of the roller shaft. The anilox for bonding the slurry is arranged on the entire curved surface of the protruding portion.

The inventor noticed that since the substrate is generally an aluminum foil or a copper foil, its thickness is very thin. For example, a PET copper foil uses 4.5 micron PET as the substrate, and both sides are each covered with a copper plating layer of one micron. The actual thickness is only 6.5 microns, and the material of the substrate is relatively soft. In the coating process, a part of substrate may wrap the edge of the protruding portion to have the wrap angle fluctuation, which will cause a change in the coating width of the substrate, and cause the coating consistency of the substrate worse.

In order to solve the problem of poor coating consistency of the substrate during the coating process of the microgravure roller, the applicant has found that a blank region is arranged on the edge of the protruding portion of the microgravure roller, so that the edge of the protruding portion will not be bonded to the slurry in the coating process, which can reduce the possibility of substrate coating width changing in the coating process, and improve the coating consistency when the microgravure roller is coating the slurry.

The coating apparatus disclosed in the embodiments of the present application may be used, but not limited to, for coating the slurry on the positive electrode current collector or the negative electrode current collector.

For the convenience of description, the following embodiments are illustrated by taking a microgravure roller 1 according to an embodiment of the present application as an example.

Figure 2:
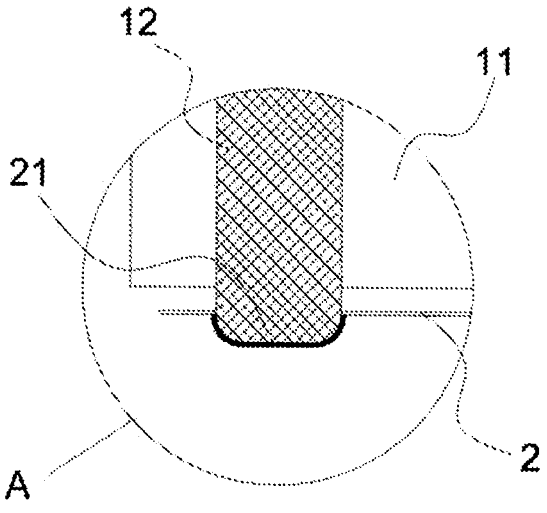
FIG. 2 is a partial enlarged diagram of a position A in FIG. 1.

Referring to FIG. 1, the microgravure roller 1 includes a roller shaft 11 and a protruding portion 12 formed on the surface of the roller shaft 11, the protruding portion 12 includes two opposite bottom surfaces and a curved surface, and the curved surface of the protruding portion 12 is covered with a laser etched anilox. Referring to FIG. 2, in the coating process, an edge of a substrate coating region 21 on a substrate 2 may wrap around an edge of the protruding portion 12, and the width of the substrate coating region 21 may fluctuate, for example, an actual width of the substrate coating region 21 is greater than a designed width of the substrate coating region 21, which deteriorates the coating consistency of the microgravure roll 1 when coating the slurry.

In order to prevent the edge of the protruding portion 12 from scratching the substrate 2, the edge of the protruding portion 12 is generally chamfered, but it is difficult to control the precision of the anilox etched at the chamfer, so that when the microgravure roller 1 coats the slurry, there will be a part of the slurry remaining in the anilox at the chamfer of the microgravure roller 1. If things go on like this, the remaining slurry will deteriorate the coating consistency when the microgravure roller 1 coats the slurry.

Figure 3:
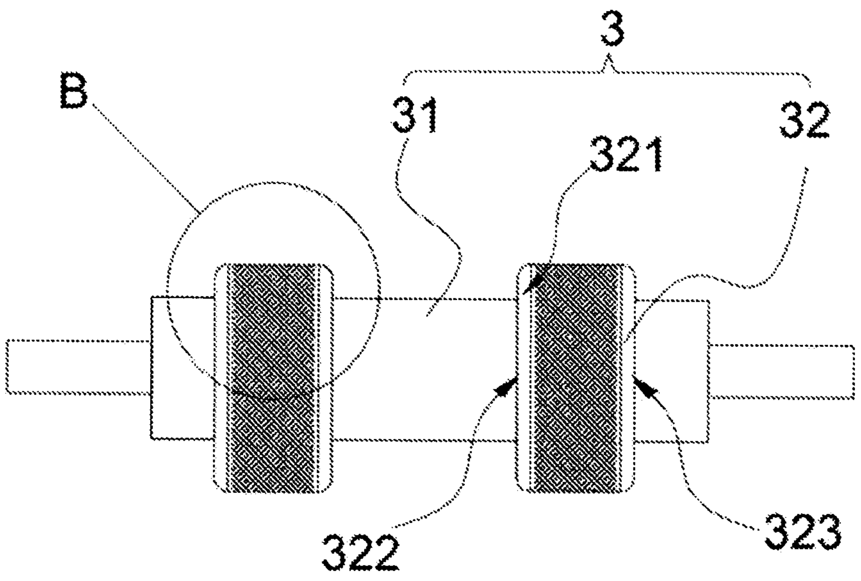
FIG. 3 is a schematic structural diagram of an anilox roller according to some embodiments of the present application.

In some embodiments of the present application, referring to FIG. 3, the present application provides an anilox roller 3, and the anilox roller 3 includes a roller body 31 and an annular boss 32 formed on a surface of the roller body 31. The annular boss 32 extends in a circumferential direction of the roller body 31. The annular boss 32 includes a circumferential surface 321, a first side surface 322, and a second side surface 323. The first side surface 322 and the second side surface 323 face each other in an axial direction of the roller body 31. The circumferential surface 321 connects the first side surface 322 and the second side surface 323, and the circumferential surface 321 includes an anilox region 324 having an etched anilox. A first blank region 325 without an etched anilox is arranged between the anilox region 324 and the first side surface 322.

The roller body 31 may be a cylinder, a cuboid, a prism, or the like. Exemplarily, the roller body 31 is a cylinder, and the surface of the roller body 31 is a curved surface of the cylinder.

The anilox may be hexagonal, rhombic, pentagonal, octagonal, polyline-shaped, and the like.

By arranging the first blank region 325 without an etched anilox between the anilox region 324 and the first side surface 322, a slurry will not be bonded near a joint of the first side surface 322 of the annular boss 32 and the circumferential surface 321, which can reduce the possibility of a change of a coating width of the substrate 2 caused by a wrap angle fluctuation of an edge of the annular boss 32 on the substrate 2, and can improve the coating consistency of the anilox roller 3 when coating the slurry.

Figure 4:
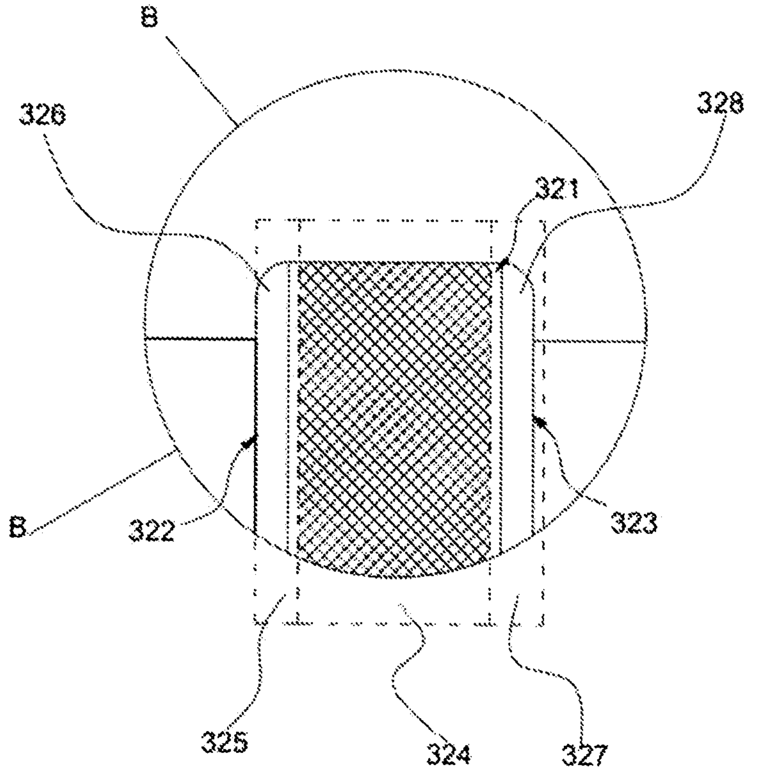
FIG. 4 is a partial enlarged diagram of a position B in FIG. 3.
Figure 5:
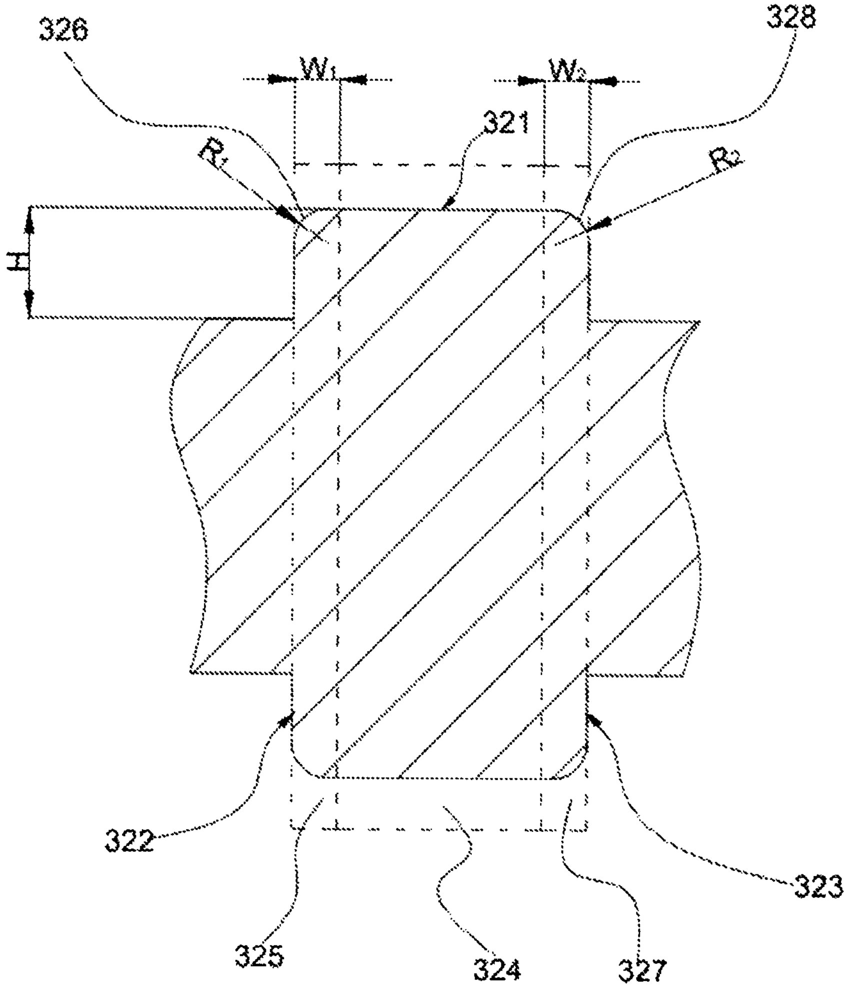
FIG. 5 is a partial sectional diagram of an anilox roller according to some embodiments of the present application.

According to some embodiments of the present application, referring to FIG. 4 and FIG. 5, a first arc chamfer 326 is formed between the circumferential surface 321 and the first side surface 322, a radius of the first arc chamfer 326 is $R_1$, and a width of the first blank region 325 is $W_1$, meeting $W_1 \geq R_1$.

$W_1 \geq R_1$ indicates that the first arc chamfer 326 is located in the first blank region 325, and the first arc chamfer 326 will not etch the anilox.

The arrangement of the first arc chamfer can reduce the possibility of scratching the substrate 2 by the annular boss 32. There is no need to etch the anilox on the surface of the first arc chamfer 326, which reduces the difficulty of etching the anilox and facilitates the control of the anilox etching precision.

According to some embodiments of the present application, referring to FIG. 4 and FIG. 5, 0.1 mm$\leq R_1 \leq$2 mm, and 0.1 mm$\leq W_1 \leq$2 mm.

$R_1$ may be any numeral value between 0.1 mm and 2 mm, for example, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, and 2 mm.

$W_1$ may be any numeral value between 0.1 mm and 2 mm, for example, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, and 2 mm.

Setting $R_1$ within a reasonable range, on the one hand, is capable of reducing the risk of scratching the substrate 2 by the annular boss 32 due to too small $R_1$, and on the other hand, is capable of alleviating the problem of increased production costs due to too large $R_1$. Controlling $W_1$ within a reasonable range, on the one hand, is capable of reducing the possibility of a change in a transverse width of the coating due to too small $W_1$, and on the other hand, is capable of alleviating the problem of increased production costs due to too large $W_1$.

According to some embodiments of the present application, referring to FIG. 4 and FIG. 5, on the basis of arranging the first blank region 325, a second blank region 327 without an etched anilox is arranged between the anilox region 324 and the second side surface 323.

The width of the first blank region 325 and the width of the second blank region 327 may be the same or different.

With such a design, the slurry will not be bonded near a joint of the first side surface 322 and the circumferential surface 321 of the annular boss 32 and near a joint of the second side surface 323 and the circumferential surface 321, which can further reduce the possibility of the change of the transverse width of the coating and improve the coating consistency when the anilox roller 3 is coating the slurry.

According to some embodiments of the present application, referring to FIG. 4 and FIG. 5, a second arc chamfer 328 is formed between the circumferential surface 321 and the second side surface 323, a radius of the second arc chamfer 328 is $R_2$, and a width of the second blank region 327 is $W_2$, meeting $W_2 \geq R_2$.

$W_2 \geq R_2$ indicates that the second arc chamfer 328 is located in the second blank region 327, and the second arc chamfer 328 will not etch the anilox.

The arrangement of the second arc chamfer 328 can reduce the possibility of scratching the substrate 2 by the annular boss 32. There is no need to etch the anilox on the surface of the first arc chamfer 326, which reduces the difficulty of etching the anilox and facilitates the control of the anilox etching precision.

According to some embodiments of the present application, referring to FIG. 4 and FIG. 5, 0.1 mm$\leq R_2 \leq$2 mm, and 0.1 mm$\leq W_2 \leq$2 mm.

$R_2$ may be any numeral value between 0.1 mm and 2 mm, for example, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, and 2 mm.

$W_2$ may be any numeral value between 0.1 mm and 2 mm, for example, 0.1 mm, 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, and 2 mm.

Setting $R_2$ within a reasonable range, on the one hand, is capable of reducing the risk of scratching the substrate 2 by the annular boss 32 due to too small $R_2$, and on the other hand, is capable of alleviating the problem of increased production costs due to too large $R_2$. Controlling $W_2$ within a reasonable range, on the one hand, is capable of reducing the possibility of a change in a transverse width of the coating due to too small $W_2$, and on the other hand, is capable of alleviating the problem of increased production costs due to too large $W_2$.

According to some embodiments of the present application, referring to FIG. 5, a height H of the annular boss 32 protruding from the surface of the roller body 31 is H, meeting 1 mm$\leq$H$\leq$60 mm.

Exemplarily, the roller body 31 is a cylinder, and H is a difference between an outer diameter of a torus of the annular boss 32 and a diameter of the roller shaft 11 of the roller body 31.

H may be any numeral value between 1 mm and 60 mm, for example, 1 mm, 5 mm, 10 mm, 15 mm, 20 mm, 25 mm, 30 mm, 35 mm, 40 mm, 45 mm, 50 mm, 55 mm, and 60 mm.

Setting H within a reasonable range, on the one hand, is capable of reducing the possibility of interference of the roller body 31 due to too small H. On the other hand, it is capable of alleviating the problem of increased production cost due to too large H.

According to some embodiments of the present application, referring to FIG. 5, 15 mm$\leq$H$\leq$25 mm.

H may be any numeral value between 15 mm and 25 mm, for example, 15 mm, 20 mm, and 25 mm.

Figure 6:
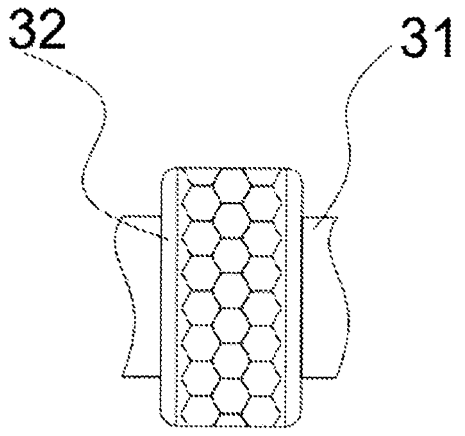
FIG. 6 is a schematic partial structural diagram of an anilox roller according to some embodiments of the present application.
Figure 7:
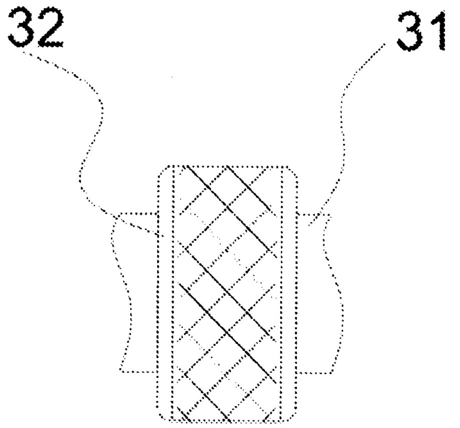
FIG. 7 is a schematic partial structural diagram of an anilox roller according to other embodiments of the present application.
Figure 8:
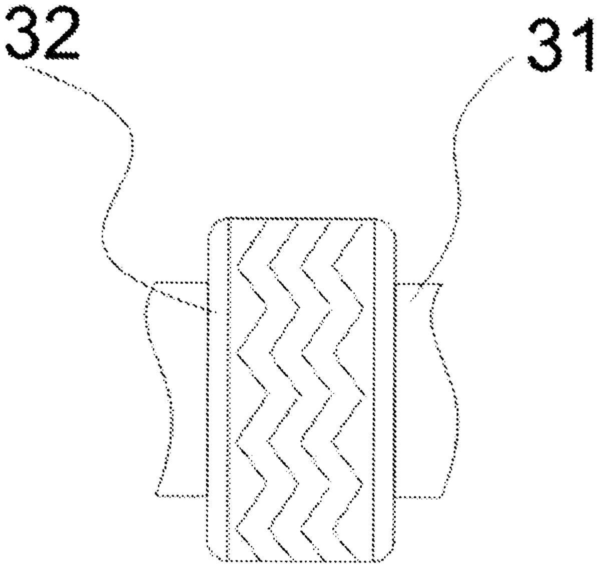
FIG. 8 is a schematic partial structural diagram of an anilox roller according to still other embodiments of the present application.

According to some embodiments of the present application, referring to FIG. 6 to FIG. 8, the anilox of the anilox region 324 is hexagonal, rhombic, or polyline-shaped.

Sizes of the aniloxs may be the same or different. Exemplarily, the anilox of the anilox region 324 is hexagonal, and the anilox region 324 is covered with a plurality of hexagonal aniloxs. Circumscribed circle diameters of different hexagonal aniloxs may be the same or different.

The anilox in the anilox region 324 being hexagonal and rhombic improves the coating efficiency and coating quality, and the anilox in the anilox region 324 being polyline-shaped can reduce the difficulty of etching the anilox.

According to some embodiments of the present application, referring to FIG. 3, a plurality of annular bosses 32 are provided, and the plurality of annular bosses 32 are arranged at intervals in the axial direction of the roller body 31.

Distances between adjacent annular bosses 32 may be the same or different.

Such a design improves the coating efficiency.

According to some embodiments of the present application, the present application provides a coating apparatus, which includes a workpiece tray provided with an accommodating space and the anilox roller 3 in the above embodiment, and the roller body 31 is mounted in the accommodating space in a rolling way.

According to some embodiments of the present application, referring to FIG. 3 to FIG. 8, the present application provides an anilox roller 3, the anilox roller 3 includes a roller body 31 and an annular boss 32 formed on the surface of the roller body 31, the annular boss 32 extends in a circumferential direction of the roller body 31, and the annular boss 32 forms a protruding portion, such that the anilox roller 3 becomes a stepped microgravure anilox roller 3.

The annular boss 32 includes a circumferential surface 321, a first side surface 322, and a second side surface 323. The first side surface 322 and the second side surface 323 face each other in an axial direction of the roller body 31. The circumferential surface 321 connects the first side surface 322 and the second side surface 323, and the circumferential surface 321 includes an anilox region 324 having an etched anilox.

A first blank region 325 without an etched anilox is arranged between the anilox region 324 and the first side surface 322. A first arc chamfer 326 is formed between the circumferential surface 321 and the first side surface 322, a radius of the first arc chamfer 326 is $R_1$, and a width of the first blank region 325 is $W_1$, meeting $W_1 \geq R_1$. $R_1$ is 0.2 mm, and $W_1$ is 0.3 mm. A second blank region 327 without an etched anilox is arranged between the anilox region 324 and the second side surface 323. A second arc chamfer 328 is formed between the circumferential surface 321 and the second side surface 323, a radius of the second arc chamfer 328 is $R_2$, and a width of the second blank region 327 is $W_2$, meeting $W_2 \geq R_2$. $R_2$ is 0.2 mm, and $W_2$ is 0.3 mm. The height of the annular boss 32 protruding from the surface of the roller body 31 is H, and H is 20 mm.

The anilox of the anilox region 324 is hexagonal, two annular bosses 32 are provided, and the two annular bosses 32 are arranged at an interval in the circumferential direction of the roller body 31.

The above are only preferred examples of the present application, and are not intended to limit the present application. For those skilled in the art, the present application may have various modifications and changes. Any modifications, equivalent replacements, improvements, and the like made within the spirit and principle of the present application shall be included within the scope of protection of the present application.

What is claimed is:

1. An anilox roller, comprising a roller body and an annular boss formed on a surface of the roller body, the annular boss extending in a circumferential direction of the roller body, the annular boss comprising a circumferential surface, a first side surface, and a second side surface, the first side surface and the second side surface facing each other in an axial direction of the roller body, the circumferential surface connecting the first side surface and the second side surface, and the circumferential surface comprising an anilox region having an etched anilox;

wherein a first blank region without an etched anilox is arranged between the anilox region and the first side surface; and wherein a height of the annular boss protruding from the surface of the roller body is H, and 5 mm≤H≤60 mm.

2. The anilox roller according to claim 1, wherein a first arc chamfer is formed between the circumferential surface and the first side surface, a radius of the first arc chamfer is $R_1$, and a width of the first blank region is $W_1$, meeting $W_1 \geq R_1$.

3. The anilox roller according to claim 2, wherein 0.1 mm≤$R_1$≤2 mm, and 0.1 mm≤$W_1$≤2 mm.

4. The anilox roller according to claim 1, wherein a second blank region without an etched anilox is arranged between the anilox region and the second side surface.

5. The anilox roller according to claim 4, wherein a second are chamfer is formed between the circumferential surface and the second side surface, a radius of the second arc chamfer is R2, and a width of the second blank region is $W_2$, meeting $W_2 \geq R_2$.

6. The anilox roller according to claim 5, wherein 0.1 mm≤$R_2$≤2 mm, and 0.1 mm≤$W_2$≤2 mm.

7. The anilox roller according to claim 1, wherein 15 mm≤H≤25 mm.

8. The anilox roller according to claim 7, wherein the anilox in the anilox region is hexagonal, rhombic, or polyline-shaped.

9. The anilox roller according to claim 1, wherein a plurality of annular bosses are provided, and the plurality of the annular bosses are arranged at intervals in the axial direction of the roller body.

10. A coating apparatus, comprising a workpiece tray with an accommodating space and the anilox roller according to claim 1, wherein the roller body is mounted in the accommodating space in a rolling way.

* * * * *